United States Patent [19]

Yamaguchi et al.

[11] Patent Number: 5,332,700
[45] Date of Patent: Jul. 26, 1994

[54] HIGH DISPERSION OPTICAL GLASS

[75] Inventors: Katsuhiko Yamaguchi; Futoshi Ishizaki; Naoyuki Goto; Hisao Yatsuda; Goro Enomoto; Hideo Yasui, all of Sagamihara, Japan

[73] Assignee: Kabushiki Kaisha Ohara, Kanagawa, Japan

[21] Appl. No.: 67,227

[22] Filed: May 26, 1993

[51] Int. Cl.⁵ .................. C03C 3/112; C03C 3/097; C03C 4/00
[52] U.S. Cl. ...................... 501/57; 501/63; 501/903
[58] Field of Search ............ 501/57, 63, 903

[56] References Cited

FOREIGN PATENT DOCUMENTS

| | | | |
|---|---|---|---|
| 3534575 | 4/1986 | Fed. Rep. of Germany | 501/903 |
| 0025812 | 2/1977 | Japan | 501/903 |
| 0045612 | 4/1977 | Japan | 501/903 |
| 0009243 | 1/1981 | Japan | 501/57 |
| 0872474 | 10/1981 | Japan | 501/57 |

*Primary Examiner*—Mark L. Bell
*Assistant Examiner*—Deborah Jones
*Attorney, Agent, or Firm*—Hedman, Gibson & Costigan

[57] ABSTRACT

An optical glass which is a $SiO_2$-$Nb_2O_5$-$R'_2O$ (where R' is an alkali metal element)-F system of a specific composition range exhibits optical constants of a refractive index (Nd) of about 1.52–1.67 and an Abbe number ($\nu$ d) of about 32–50, is free of PbO and has an improved light transmissivity.

8 Claims, No Drawings

HIGH DISPERSION OPTICAL GLASS

BACKGROUND OF THE INVENTION

This invention relates to a high dispersion optical glass of a $SiO_2$-$Nb_2O_5$-$R'_2O$ (where $R'$ is an alkali metal element)-F system having optical constants of a refractive index (Nd) of about 1.52–1.67 and an Abbe number ($\nu$ d) of about 32–50 which is excellent in light transmissivity and contains a relatively large content of $Nb_2O_5$ ingredient.

Known in the art as optical glasses having the above described optical constants are glasses of a $SiO_2$-PbO-$R'_2O$ system, a $SiO_2$-$TiO_2$-$R'_2O$ system and a $SiO_2$-$TiO_2$-$R'_2O$-F system disclosed in the specification of U.S. Pat. No. 2,481,701. The first mentioned prior art optical glass, however, contains toxic PbO and the latter two optical glasses are disadvantageous in that they have not excellent light transmissivity.

Japanese Patent Application Laid-open No. Sho 52-25812 discloses a glass of a $SiO_2$-$TiO_2$-$Nb_2O_5$-$R'_2O$ system and Japanese Patent Application Laid-open No. Sho 52-45612 discloses a glass of a $SiO_2$-$Nb_2O_5$-$R''_2O$ (where $R''$ is a divalent metal element)-$R'_2O$ system. These glasses, however, do not sufficiently satisfy both a high dispersion optical characteristic and an excellent optical transmissivity which are the target of the present invention.

It is, therefore, an object of the invention to eliminate the disadvantages of the prior art optical glasses comprehensively by providing a novel optical glass which is free from the toxic PbO ingredient, has optical constants of a refractive index (Nd) of about 1.52–1.67 and an Abbe number ($\nu$ d) of about 32–50, and has an excellent light transmissivity.

SUMMARY OF THE INVENTION

Accumulated studies and experiments made by the inventors of the present invention for achieving the above described object have resulted in a finding, which has led to the present invention, that an optical glass having the desired optical constants and an improved light transmissivity can be obtained in a $SiO_2$-$Nb_2O_5$-$R'_2$-F system glass within a certain composition range.

The optical glass achieving the above described object of the invention is characterized in that the glass comprises in weight percent:

| | |
|---|---|
| $SiO_2$ | 47–70% |
| $Al_2O_3$ | 0–15% |
| $Nb_2O_5$ | 15.5–35% |
| $TiO_2$ | 0–15% |
| $ZrO_2$ | 0–10% |
| $Li_2O + Na_2O + K_2O$ | 10–35% |
| in which | |
| $Li_2O$ | 0–10% |
| $Na_2O$ | 0–20% |
| $K_2O$ | 0–20% |
| $ZnO + MgO + CaO + SrO + BaO$ | 0–5% |
| and a fluoride or fluorides of a metal element or elements contained in one or more of the above metal oxide or oxides, said fluoride or fluorides substituting for said metal oxide or oxides partially or entirely, and a total amount of F contained in the fluoride or fluorides | 0.1–10% |

In a preferred embodiment of the invention, the high dispersion optical glass as defined above has the total amount of F which is in the range 0.1–7%.

DETAILED DESCRIPTION OF THE INVENTION

The amount of fluoride is computed as the total amount of the elemental fluorine element present in the glass as shown by the separate computation of the fluoride compound and the separate computation of the elemental fluorine in the Examples.

In the optical glass made according to the invention, the above described content ranges of the respective ingredients have been selected for the reasons stated below. In the following description, the content range of the respective ingredients are expressed in weight percent.

The amount of $SiO_2$ which is an indispensable ingredient for forming a glass should be within the range of 47–70%. If the amount is less than 47%, chemical durability of the glass will deteriorate whereas if the amount exceeds 70%, melting property of the glass will deteriorate.

The $Al_2O_3$ ingredient may be added as desired for adjusting optical constants and improving stability of the glass. If the amount exceeds 15%, melting property of the glass will deteriorate with resulting difficulty in obtaining a homogeneous glass.

The $Nb_2O_5$ ingredient is an important ingredient in the glass of the present invention because it contributes to improving of high dispersion characteristic and light transmissivity. If, however, the amount is less than 15.5%, the target optical constants cannot be obtained whereas, if the amount exceeds 35%, devitrification tendency of the glass will increase.

The $TiO_2$ ingredient may be added as desired for improving the refractive index and decrease the Abbe number of the glass. If the amount exceeds 15%, the glass tends to become tinted.

The $ZrO_2$ ingredient may be added as desired for improving chemical durability of the glass. If the amount exceeds 10%, devitrification tendency of the glass will increase.

The $Li_2O$, $Na_2O$ and $K_2O$ ingredients may be added as desired because these ingredients are effective for facilitating melting of the glass. If, however, the amounts of these ingredients exceed 10%, 20% and 20% respectively, the refractive index of the glass will decrease. On the other hand, if the total amount of one or more of these ingredients is less than 10%, the above described effect cannot be obtained sufficiently whereas, if the total amount exceeds 35%, chemical durability of the glass will deteriorate.

The ZnO, MgO, CaO, SrO and BaO ingredients may be added as desired because these ingredients are effective for improving melting property of the glass. If, however, the total amount of one or more of these ingredients exceeds 5%, it will become difficult to maintain the target optical constants.

The fluorine (F) ingredient is an important ingredient in the glass of the present invention in that it increases the high dispersion characteristic to the refractive index and increases light transmissivity. If the amount of F is less than 0.1%, these effect will not be obtained sufficiently whereas the amount should not exceed 10%, and preferably should be 7% or below, because if the amount exceeds 10%, cord occurs in the glass during melting with resulting difficulty in obtaining a homogeneous glass.

In addition to the above described ingredients, a known defoaming agent such as $Sb_2O_3$ may be added up to about 0.5%.

Table 1 shows examples of the high dispersion optical glass according to the invention (No. 1 to No. 10) and comparative examples of the prior art optical glasses (No. A and No. B) as well as refractive index (Nd), Abbe number ($\nu d$) and wavelengths of light in the unit of 10 nm producing light transmissivity of 80% (T80) in a specimen with two polished opposite surfaces having thickness of 10 mm.

(in weight percent)

| No. | Examples | | | | | | | | | | Comparative Examples | |
|---|---|---|---|---|---|---|---|---|---|---|---|---|
| | 1 | 2 | 3 | 4 | 5 | 6 | 7 | 8 | 9 | 10 | A | B |
| $SiO_2$ | 50.2 | 51.5 | 53.7 | 53.5 | 63.9 | 47.8 | 48.5 | 50.3 | 54.5 | 52.1 | 48.9 | 60.0 |
| $Nb_2O_5$ | 26.5 | 16.0 | 15.5 | 21.5 | 16.0 | 18.0 | 23.0 | 20.0 | 16.3 | 25.0 | | |
| $TiO_2$ | | 14.5 | 7.0 | 7.0 | 1.0 | 3.0 | 1.0 | 5.0 | 11.0 | 5.0 | 24.7 | 16.0 |
| $Li_2O$ | 2.0 | | 2.0 | | | | | | | | | |
| $Na_2O$ | 9.0 | 4.2 | 9.0 | 4.2 | 7.2 | 7.7 | 0.7 | 5.0 | 1.5 | | | |
| NaF | | 3.1 | | 3.1 | 0.9 | | 2.8 | | | 7.9 | | 13.8 |
| $K_2O$ | 5.5 | | 7.5 | | | | | 6.9 | 2.7 | 8.4 | 14.9 | 10.0 |
| KF | 3.1 | 10.5 | 3.1 | 10.5 | 10.9 | 18.4 | 16.9 | 7.6 | 13.8 | 1.5 | 6.0 | |
| (F) | (1.0) | (4.8) | (1.0) | (4.8) | (4.0) | (6.0) | (6.8) | (2.5) | (4.5) | (0.5) | (2.0) | |
| $Al_2O_3$ | | | | | | | 5.0 | | | | 5.0 | |
| $ZrO_2$ | | | | | | | 2.0 | | | | | |
| ZnO | | | 2.0 | | | | | | | | | |
| CaO | | | | | | 5.0 | | | | | | |
| BaO | 3.5 | | | | | | | 5.0 | | | | |
| $As_2O_3$ | | | | | | | 0.1 | | | | 0.5 | |
| $Sb_2O_3$ | 0.2 | 0.2 | 0.2 | 0.2 | 0.1 | 0.1 | | 0.2 | 0.2 | 0.1 | | 0.2 |
| Nd | 1.62340 | 1.64210 | 1.61660 | 1.60995 | 1.53870 | 1.57383 | 1.57270 | 1.60164 | 1.61410 | 1.58093 | 1.6142 | 1.5804 |
| $\nu d$ | 49.8 | 38.6 | 40.2 | 36.5 | 47.6 | 40.9 | 43.0 | 47.6 | 35.8 | 40.9 | 32.9 | 41.8 |
| $T_{80}$ (nm) | 360 | 385 | 380 | 375 | 352 | 364 | 360 | 364 | 378 | 364 | 408 | 395 |

As shown in Table 1, the glasses of No. 9 and No. 10 of the examples of the present invention have wavelengths of light shifted largely to the short wavelength side compared with the glasses of No. A and No. B of the prior art glasses which have about the same optical constants and this clearly indicates improvement in light transmissivity in the glasses of the present invention. The glasses of No. 1 to No. 8 of the examples of the present invention also exhibit an excellent light transmissivity.

The glasses of the examples of the present invention can be obtained by weighing and mixing normal optical glass raw materials such as oxides, carbonates, nitrates and fluorides, melting and defoaming the raw materials in a platinum crucible at 1200°–1400° C. for about 2 to 5 hours, stirring the molten glass to homogenize it and thereafter casting it in a mold and annealing it.

What is claimed is:

1. A high dispersion optical glass which comprises in weight percent:

| | |
|---|---|
| $SiO_2$ | 47–70% |
| $Al_2O_3$ | 0–15% |
| $Nb_2O_5$ | 15.5–35% |
| $TiO_2$ | 0–15% |
| $ZrO_2$ | 0–10% |
| $LiO_2 + Na_2O + K_2O$ | 10–35% |
| in which | |
| $LiO_2$ | 0–10% |
| $Na_2O$ | 0–20% |
| $K_2O$ | 0–20% |
| $ZnO + MgO + CaO + SrO + BaO$ | 0–2% |
| and a fluoride or fluorides of a metal element or elements contained in one or more of the above metal oxide or oxides, said fluoride or fluorides substituting for said metal oxides partially or entirely, and a total amount of F contained in the fluoride or fluorides | 0.1–10%. | essentially of in weight percent:

2. A high dispersion optical glass which consists

| | |
|---|---|
| $SiO_2$ | 47–70% |
| $Al_2O_3$ | 0–15% |
| $Nb_2O_5$ | 15.5–35% |
| $TiO_2$ | 0–15% |
| $ZrO_2$ | 0–10% |
| $LiO_2 + Na_2O + K_2O$ | 10–35% |
| in which | |
| $LiO_2$ | 0–10% |
| $Na_2O$ | 0–20% |
| $K_2O$ | 0–20% |
| $ZnO + MgO + CaO + SrO + BaO$ | 0–2% |
| and a fluoride or fluorides of a metal element or elements contained in one or more of the above metal oxide or oxides, said fluoride or fluorides substituting for said metal oxides partially or entirely, and a total amount of F contained in the fluoride or fluorides | 0.1–10%. |

3. A high dispersion optical glass as defined in claim 1 wherein the total amount of F is 0.1–7%.

4. A high dispersion optical glass as defined in claim 2 wherein the total amount of F is 0.1–7%.

5. A high dispersion optical glass as defined in claim 2 wherein the total amount of $ZnO+MgO+CaO+SrO+BaO$ equals 2%.

6. A high dispersion as defined in claim 2 wherein the total amount of $ZnO+MgO+CaO+SrO+BaO$ equals 0%.

7. A high dispersion optical glass as defined in claim 1 wherein the total amount of $ZnO+MgO+CaO+SrO+BaO$ equals 2%.

8. A high dispersion as defined in claim 3 wherein the total amount of $ZnO+MgO+CaO+SrO+BaO$ equals 0%.

* * * * *